United States Patent [19]

Pinson

[11] Patent Number: 4,546,264
[45] Date of Patent: Oct. 8, 1985

[54] RELATING CELLULAR ENERGY GENERATING AND STORAGE DEVICE

[75] Inventor: George T. Pinson, Huntsville, Ala.
[73] Assignee: The Boeing Company, Seattle, Wash.
[21] Appl. No.: 544,587
[22] Filed: Oct. 24, 1983
[51] Int. Cl.⁴ ............................................. H02P 9/04
[52] U.S. Cl. ...................................... 290/54; 290/42; 290/43; 290/55; 417/330; 417/333; 415/7; 74/572
[58] Field of Search ...................... 290/42, 43, 44, 53, 290/54, 55, 1 R, 2; 417/330, 333, 334; 415/5, 7; 60/495, 496, 497, 498, 499, 500, 501, 502, 503, 504, 505, 506, 507; 416/132 A, 132 B; 74/572

[56] References Cited

U.S. PATENT DOCUMENTS

| | | | |
|---|---|---|---|
| 3,231,749 | 1/1966 | Hinck, III | 415/7 X |
| 3,248,967 | 5/1966 | Lewis | 74/573 X |
| 4,159,427 | 6/1979 | Wiedemann | 290/55 |
| 4,247,785 | 1/1981 | Apgar | 290/1 R |
| 4,263,819 | 4/1981 | Poubeau | 74/573 R |
| 4,318,019 | 3/1982 | Teasley et al. | 290/55 X |
| 4,433,544 | 2/1984 | Wells et al. | 290/55 X |

FOREIGN PATENT DOCUMENTS 0000651  1/1983  Japan ..................................... 74/572

Primary Examiner—William M. Shoop, Jr.
Assistant Examiner—Shik Luen Paul Ip
Attorney, Agent, or Firm—Edwin H. Crabtree

[57] ABSTRACT

A rotating cellular energy generating device for generating electrical power for extended periods of time. The generating device characterized by having an annular rotating housing having a plurality of individual compartments therein. The compartments receiving material which is compartmentalized to accurately control the mass distribution in the rotating housing for maintaining speed as power is withdrawn or generated during the rotation of the housing.

8 Claims, 4 Drawing Figures

RELATING CELLULAR ENERGY GENERATING AND STORAGE DEVICE

BACKGROUND OF THE INVENTION

This invention relates to an electrical power generating device and more particularly but not by way of limitation to a rotating cellular energy generating device which has the capabilities of storing large amounts of power for extended periods of time so the power can be used immediately or stored for use at a later time.

Heretofore, there have been different ways of generating and storing electrical power with the classical methods associated with nuclear energy, fuel oil, coal and hydroelectric power generation. Less common methods used are fuel cells, solar cells and wind powered turbines. None of these electrical generating methods have the ability to store power for extended periods of time.

The use of wind power to generate electricity is very attractive since wind power is a renewable source and wind powered electrical generators are non-polluting. The inability to store power for use when the wind is not blowing however, prevents widespread use of wind power generators.

Electrical power which may be stored for later use includes electrical batteries, the breakdown of water into hydrogen and oxygen to generate steam to drive a generator, pumping of water to a reservoir for later use in a hydroelectric generator and the use of high speed flywheels. None of these methods are efficient or practical for larger scale power storage.

Flywheels have long been proposed for use in storing power. These type devices rely on the use of a relatively small solid flywheel rotating at high speeds. These devices must be designed to withstand forces associated with rotation rates of several thousand of revolutions per minute. The forces associated with these high speed and the acceleration and deceleration of the flywheel are destructive in nature and relatively minor effects can cause catastrophic failure of the flywheel. In addition, all of the known proposed flywheels are designed to give up power in ways which result in a rapid slowing of the flywheel speed.

The subject invention provides a unique device which eliminates the above mentioned problems and provides means for generating electrical power for extended periods of time.

SUMMARY OF THE INVENTION

The subject invention provides a rotating cellular power generating device which generates power for extended periods of time.

The device provides for mass distribution which may be changed at will to facilitate bringing the device up to a predetermined speed and enable the device to maintain speed as power is withdrawn from the system.

The device uses common, electrical generating components embedded in a rotating housing and a containment which can be used either as a motor to accumulate energy or as a generator to provide power upon demand.

During the start up of the generating device wind currents, or ocean currents acting as auxillary power may be used. Also, mechanical power sources such as external motors, engines, steam plants and the like may also be used as auxiliary power.

The power generating device may be used in relationship to ships, aircraft, mobile ground equipment, space applications, or fixed land and water installations for the accumulation and release of power. Further, the device can be used in conjunction with current power generating stations to provide power to an electrical grid during times of peak load demands.

The rotating cellular power generating device includes a rotating annular shaped housing having a support shaft received and surrounded by a containment. A plurality of individual compartments are constructed in the rotating housing. Pumps are used for removing material in the compartments as the power is used and for filling the containers as power is generated. Auxillary power is provided such as aerodynamic foils for initially rotating the housing to a pre-determined speed and intermittently maintaining the pre-determined speed as the need is required. The rotating housing includes armature windings mounted around the periphery thereof and adjacent field windings mounted in the sides of the containment. The auxillary power may also be provided by one or more externally mounted motors to bring the rotating system up to speed and maintain the power level of the system. The rotating system in turn can drive a conventional generator either directly or through a drive train.

The advantage and objects of the invention will become evident from the following detailed description of the drawings when read in connection with the accompanying drawings which illustrate preferred embodiments of the invention.

DETAILED DESCRIPTION OF THE DRAWINGS

Figure 1:
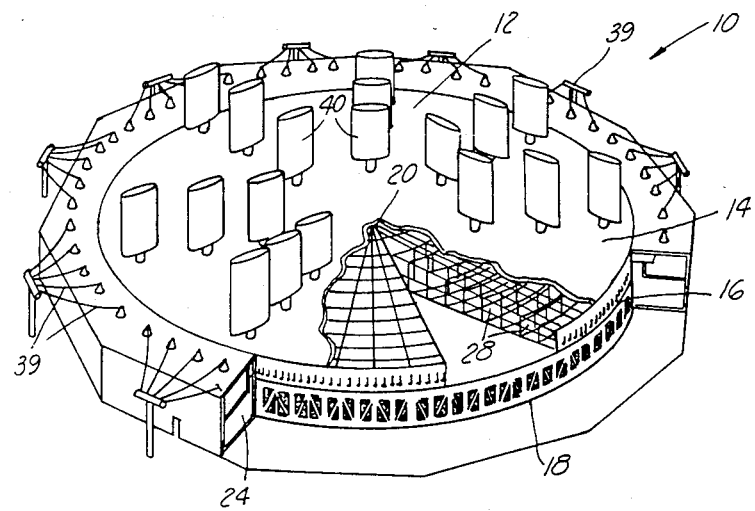
FIG. 1 illustrates a perspective view of a typical power generating station using the subject cellular power generating device.
Figure 2:
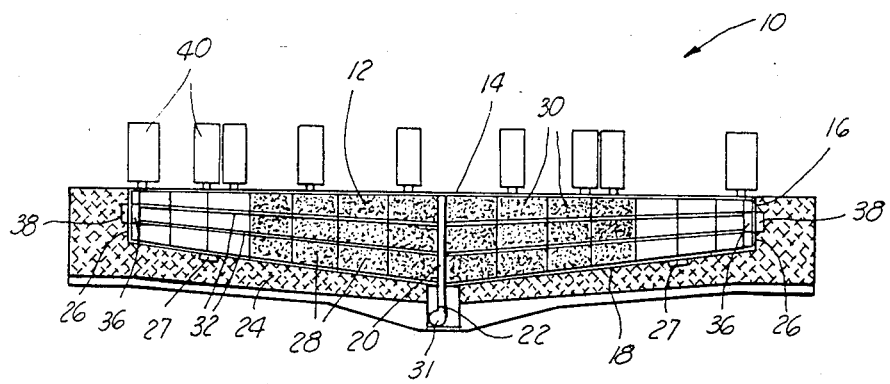
FIG. 2 is a side sectional view of the generating device.

In FIG. 1 and FIG. 2 the rotating cellular power generating device is illustrated by general reference numeral 10. The device 10 includes an annular rotating housing 12 having a top 14, sides 16 and a bottom 18. The rotating housing 12 is mounted on a support shaft 20 with one end of the support shaft 20 received in a shaft housing 22 in the bottom of a containment 24. The containment 24 includes sides 26 surrounding the side 16 of the housing 12. The housing 12 rotates on top of magnet or fluid support bearings 27 or similar types of mechanical bearings received in the containment 24.

The rotating housing 12 is characterized by having a plurality of individual compartments 28 therein for receiving either a liquid or non-liquid material 30 shown in a portion of the compartments 28 in FIG. 2. The outer compartments 28 in the housing 12 have had material 30 removed therefrom. The material 30 may be moved using a support pump 31 in the shaft housing 22 and transferring the material through fill and drain lines 32 or by using the forces acting on the material to force the material through the drain lines 32.

The housing 12 includes armature windings 36 which are mounted around the periphery thereof and adjacent field windings 38 mounted in the sides 26 of the containment 24. As power is generated by the device 10, the electrical power is drawn from the device 10 using standard electrical transmission lines 39.

Mounted on top of the housing 12 are aerodynamic foils 40 which are used for initially rotating the housing 12 to a predetermined speed and maintaining the speed as the need is required.

During the start-up of the generating and storage device 10, all of the material 30 is removed from the storage compartments 28. The removal of the material 30 reduces the rotational inertia of the rotating housing 12 to a minimum. The aerodynamic foils 40 are oriented so when air currents or water currents place a force on the foils 40, this force is transmitted into the body of the rotating housing 12. As the rotating housing 12 moves the foils 40 can be adjusted to be feathered into the wind and moved perpendicular to the wind when rotating with the direction of the wind.

Figure 3:
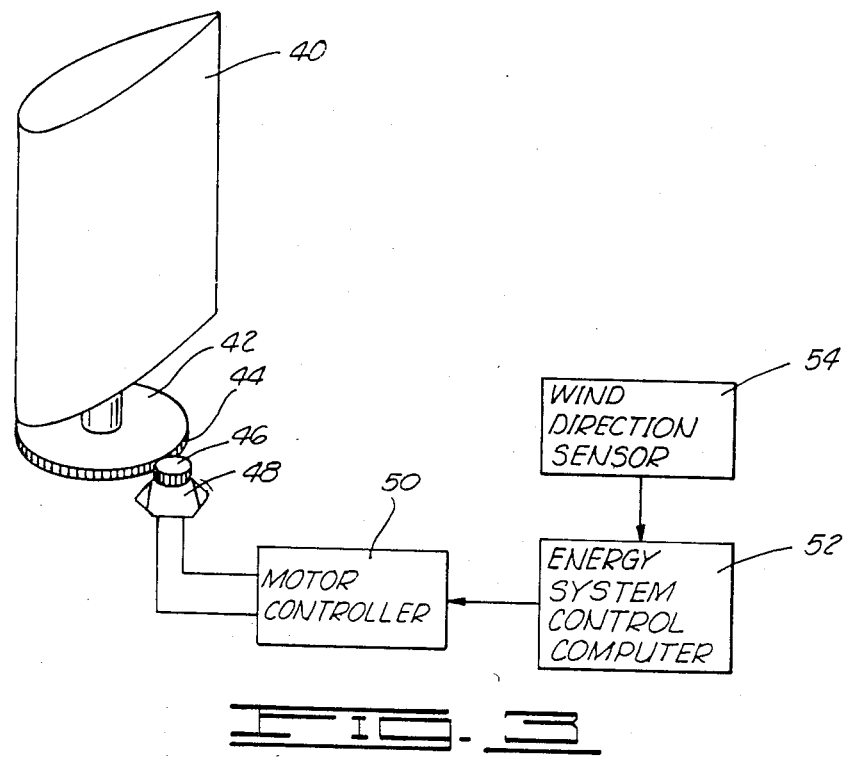
FIG. 3 is a perspective view of an aerodynamic foil and control system.

The aerodynamic foils 40 shown in FIG. 3 are mounted on a rotating base 42 having a gear train 44 engaging a drive gear 46. The drive gear 46 is connected to a drive motor 48 which is controlled by a motor controller 50. The controller 50 is connected to an power system control computer 52 which is connected to a wind direction sensor 54. The sensor 54 and computer 52 provide the data required so the controller 50 can govern the motor 48 in rotating the aerodynamic foil 40 to its proper adjustment.

Figure 4:
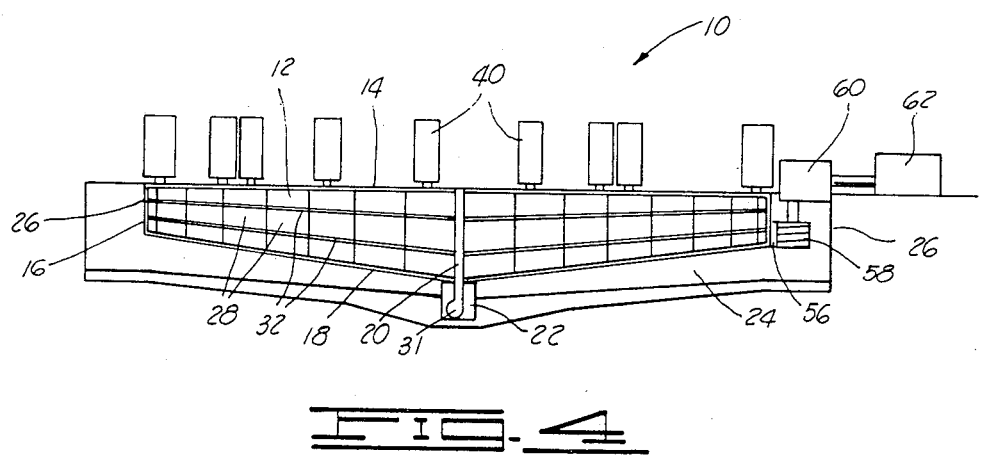
FIG. 4 illustrates a typical use of auxillary power used in driving the power generating device.

While the aerodynamic foils 40 are shown, it should be kept in mind that other suitable auxillary power devices can be used equally well as shown in FIG. 4. The rotating housing 12 in this example includes a transmission gear section 56 which engages a drive gear 58 connected to a transmission 60. The transmission 60 is driven by a drive engine 62 powered by conventional power means. The auxillary power unit could also be attached directly to the shaft 20.

Referring back to FIGS. 1, 2 and 3, in operation the rotating housing 12 when it begins to move in response to auxillary forces acting thereon for example, using the aerodynamic foils 40, the housing 12 is allowed to increase to a pre-determined speed. A liquid such as water or other suitable fluids or non-fluid materials are loaded into the storage containers 28. At this time, the power of the rotating system increases proportionally to the amount of material stored in the storage compartments 28. As the device 10 generates electrical power and the power is removed from the device 10 the compartments 28 are emptied in such a manner that the rotational speed of the housing 12 is maintained at a constant. For example, when the aerodynamic foils 40 are used and the wind or water current increases, the energy level of the system therefore increases and the compartments 28 again are refilled. Both the filling and removing of the material 30 from the compartments 28 are controlled automatically using onboard computers or appropriate monitor control systems.

It should be kept in mind the size of the rotating housing 12 is not limited and the larger the housing 12, the more efficient the device 10 will be and the more power can be stored and removed from the device 10. The size of the rotating housing 12 will be determined by the average power to be generated by the device 10 together with a definition of the maximum amount of time the electrical energy will be withdrawn during the periods of usage. It should be obvious the size of the housing 12 could be several hundred feet in diameter or greater.

As mentioned above, it is also obvious to provide auxiliary power means other than wind or water current in driving the rotating housing 12. A steam engine using coal or other hydrocarbon energy sources or jet engines, rocket engines or electrical power sources could be be used in rotating the housing and maintaining its required speed.

It is also obvious that the moving of the material to maintain constant rotating speed is a basic concept. The means to accomplish this can use methods as described above or it can be appreciated, a series of solid masses that are allowed to slide outwardly towards the periphery of the housing to increase the systems inertia could be used and the masses pulled back toward the center of the housing to decrease the moment of inertia and thereby increase or maintain the speed of the power generator device.

Changes may be made in the construction and arrangement of the parts or elements of the embodiments as described herein without departing from the spirit or scope of the invention defined in the following claims.

What is claimed is:

1. A rotating cellular energy generating device for generating electrical power for extended periods of time, the device comprising:
   an annular rotating housing having sides, a bottom and a top;
   a containment surrounding the sides and the bottom of the rotating housing;
   a plurality of individual compartments in the housing for holding movable material therein;
   auxiliary power means for initially rotating the housing to a pre-determined speed and periodically maintaining the pre-determined speed as the need is required;
   means for redistributing the material in the compartments as energy is used and as the energy is developed;
   armature windings mounted around the periphery of the housing; and
   field windings mounted in the containment and adjacent the armature windings.

2. The device as described in claim 1 wherein the auxiliary power means is aerodynamic foils mounted on top of the rotating housing.

3. The device as described in claim 1 wherein the auxiliary power means is a drive engine coupled to a transmission and a drive gear, the drive gear engaging the rotating housing.

4. A rotating cellular energy generating device for generating electrical power for extended periods of time, the device comprising:
   a rotating housing;
   a containment surrounding the rotating housing;
   a plurality of individual compartments in the housing for holding movable material therein;
   auxiliary power means connected to the housing for rotating the housing and maintaining the housing at a pre-determined speed as the need is required;
   means for redistributing the material in the compartments as energy is used and as the energy is developed;
   armature windings mounted on the rotating housing; and
   field windings mounted in the containment and adjacent the armature windings.

5. The device as described in claim 4 wherein the auxillary power means is aerodynamic foils connected to the rotating housing, the aerodynamic foils mounted on a rotating base and driven by a motor controller, the motor controller controlled by an energy system control computer connected to a wind direction sensor for adjusting the aerodynamic foils in the directions of wind or water currents.

6. The device as described in claim 4 wherein the auxillary power means is a drive engine driven by a conventional energy source and coupled to a transmission, the transmission connected to a drive gear, the drive gear engaging the housing for rotating the housing.

7. The device as described in claim 4 wherein the rotating housing is supported on magnetic support bearings mounted in the containment.

8. The device as described in claim 4 wherein the means for removing and filling the compartments with material is a support pump connected to individual fill and drain lines leading to each compartment in the housing.

* * * * *